United States Patent
Xiong et al.

(10) Patent No.: US 11,025,376 B2
(45) Date of Patent: Jun. 1, 2021

(54) DYNAMIC PARTITION RESOURCE ALLOCATION IN 5G NETWORKS

(71) Applicant: Apple Inc., Cupertino, CA (US)

(72) Inventors: Gang Xiong, Beaverton, OR (US); Pingping Zong, Randolph, NJ (US); Yujian Zhang, Beijing (CN); Mo-Han Fong, Sunnyvale, CA (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/574,765

(22) PCT Filed: Dec. 15, 2015

(86) PCT No.: PCT/US2015/065770
§ 371 (c)(1),
(2) Date: Nov. 16, 2017

(87) PCT Pub. No.: WO2016/209311
PCT Pub. Date: Dec. 29, 2016

(65) Prior Publication Data
US 2018/0152269 A1     May 31, 2018

Related U.S. Application Data

(60) Provisional application No. 62/184,435, filed on Jun. 25, 2015.

(51) Int. Cl.
*H04L 5/00*      (2006.01)
*H04W 72/04*      (2009.01)
(Continued)

(52) U.S. Cl.
CPC ............ *H04L 5/001* (2013.01); *H04L 5/0053* (2013.01); *H04L 5/0094* (2013.01); *H04W 4/70* (2018.02);
(Continued)

(58) Field of Classification Search
CPC ........... H04W 72/042; H04W 72/0446; H04W 72/0453; H04W 72/048; H04W 72/0486; H04W 72/0493; H04W 72/1289
See application file for complete search history.

(56) References Cited

U.S. PATENT DOCUMENTS

| 2011/0007673 A1 | 1/2011 | Ahn et al. |
| 2013/0077582 A1 | 3/2013 | Kim et al. |

(Continued)

FOREIGN PATENT DOCUMENTS

| CN | 107771409 A | 3/2018 |
| WO | WO-2013082784 A1 | 6/2013 |

(Continued)

OTHER PUBLICATIONS

"International Application Serial No. PCT/US2015/065770, International Search Report dated Apr. 29, 2016", 3 pgs.

(Continued)

*Primary Examiner* — Pao Sinkantarakorn
(74) *Attorney, Agent, or Firm* — Kowert, Hood, Munyon, Rankin & Goetzel, P.C.

(57) ABSTRACT

Disclosed herein are apparatuses, systems, and methods using or implementing dynamic resource allocation (DRA) of resources for machine-type communication (MTC), as a secondary partition within a system bandwidth. Allocations outside the secondary partition are configured as a primary partition for other than MTC. Apparatuses may perform MTC communications within the secondary partition when DRA configuration information includes allocation information for the secondary partition and the apparatus is configured for MTC. Otherwise, if the apparatus is other than MTC, the apparatus may refrain from performing communications in the secondary partition. Other embodiments are described.

20 Claims, 12 Drawing Sheets

Lightly Loaded MTC System

Heavily Loaded MTC System

(51) Int. Cl.
  *H04W 4/70* (2018.01)
  *H04W 72/00* (2009.01)
  *H04L 29/08* (2006.01)
  *H04W 88/02* (2009.01)

(52) U.S. Cl.
  CPC ......... *H04W 72/005* (2013.01); *H04W 72/04* (2013.01); *H04W 72/048* (2013.01); *H04L 69/324* (2013.01); *H04W 72/0486* (2013.01); *H04W 88/02* (2013.01)

(56) References Cited

U.S. PATENT DOCUMENTS

| | | | |
|---|---|---|---|
| 2013/0083753 A1 | 4/2013 | Lee et al. | |
| 2014/0133433 A1 | 5/2014 | Ahn et al. | |
| 2017/0272895 A1* | 9/2017 | Park | H04W 72/042 |
| 2018/0007667 A1* | 1/2018 | You | H04W 72/042 |
| 2018/0234998 A1* | 8/2018 | You | H04W 72/042 |
| 2018/0337752 A1* | 11/2018 | Choi | H04L 1/1896 |

FOREIGN PATENT DOCUMENTS

| | | |
|---|---|---|
| WO | WO-2013116973 A1 | 8/2013 |
| WO | WO-2014204285 A1 | 12/2014 |
| WO | WO-2016209311 A1 | 12/2016 |

OTHER PUBLICATIONS

"International Application Serial No. PCT/US2015/065770, Written Opinion dated Apr. 29, 2016", 10 pgs.

"European Application Serial No. 15896590.5, Extended European Search Report dated Jan. 4, 2019", 8 pgs.

"European Application Serial No. 15896590.5, Response filed Aug. 1, 2019 to Extended European Search Report dated Jan. 4, 2019", 15 pgs.

Communication Pursuant to article 94(3) EPC in Application No. 15896590.5, dated Jun. 22, 2020, 7 pgs.

Huawei et al: "Discussion on the resource allocation for low cost MTG UEs", EPO Form 2906 01 .91 TRI 3GPP Draft; R1-141119, 3rd Generation Partnership Project (3GPP), Mobile Competence Centre; 650, Route Des Lucioles; F-06921 Sophia-Antipolis Cedex; France vol. RAN WG1, No. Shenzhen, China; Mar. 31, 2014-Apr. 4, 2014 Mar. 22, 2014 (Mar. 22, 2014), XP050813621, Retrieved from the Internet: URL:http://www.3gpp.org/ftp/tsg_ran/WG1_RL1/TSGR1_ 76b/Docs/[retrieved on Mar. 22, 2014], 3 pgs.

* cited by examiner

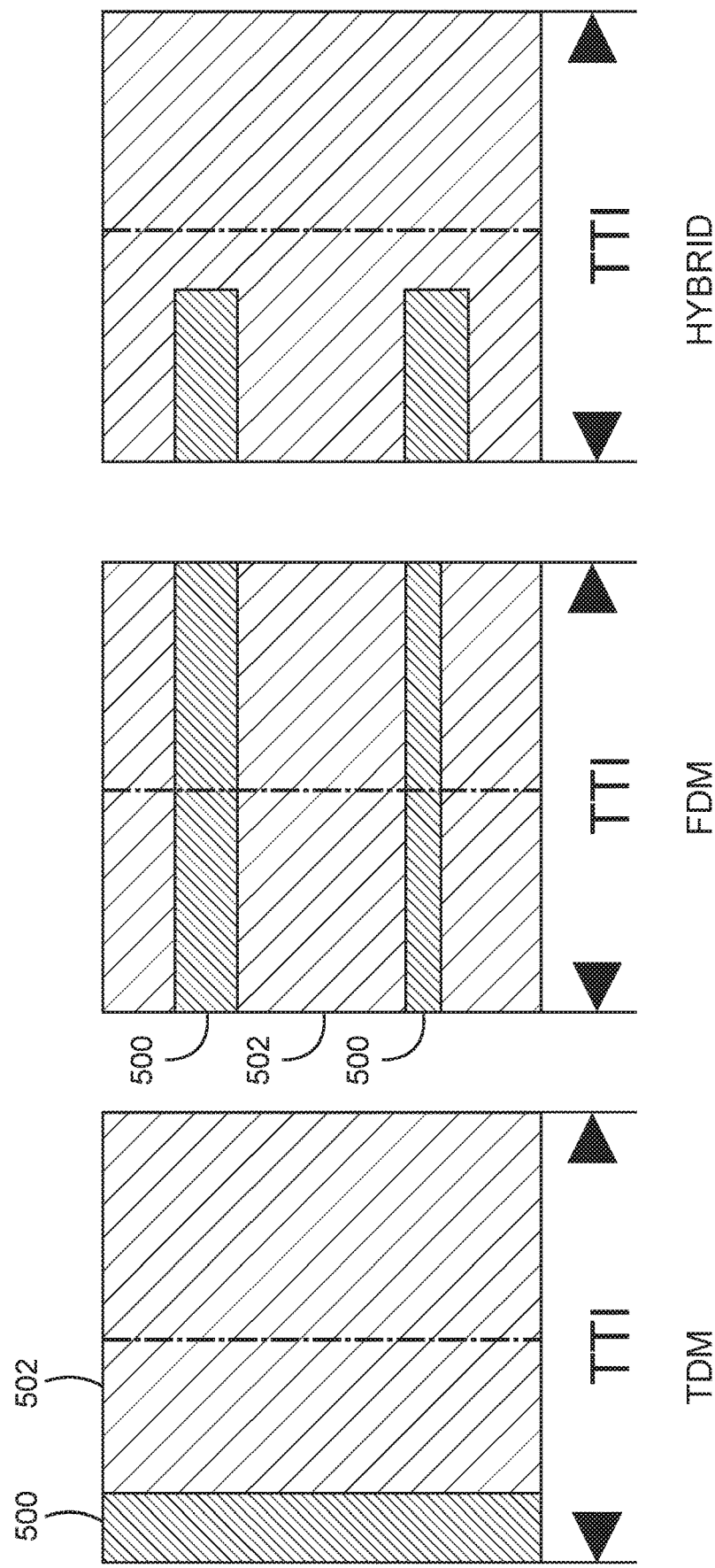

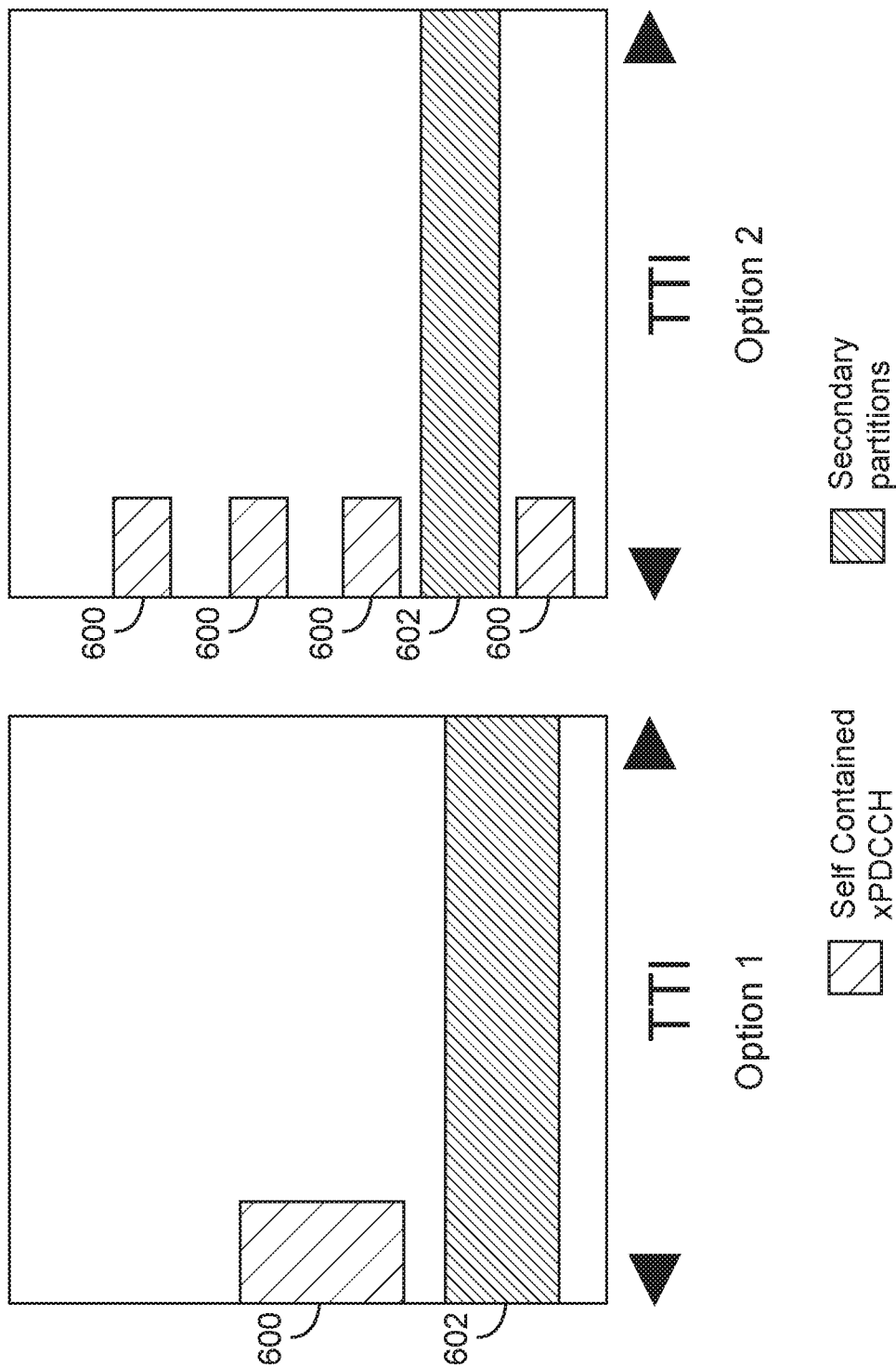

Reference Symbol    Symbol for dedicated control channel xPSS    xSSS    Dedicated control channel

US 11,025,376 B2

DYNAMIC PARTITION RESOURCE ALLOCATION IN 5G NETWORKS

CLAIM OF PRIORITY

This patent application is a U.S. National Stage Filing under 35 U.S.C. 371 from International Application No. PCT/US2015/065770, filed on Dec. 15, 2015, and published as WO 2016/209311 on Dec. 29, 2016, which claims the benefit of U.S. Provisional Patent Application No. 62/184,435, filed Jun. 25, 2015, entitled "SYSTEM AND METHOD ON DYNAMIC RESOURCE ALLOCATION OF PARTITIONS FOR 5G," each of which are incorporated by reference herein in their entirety.

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of embodiments is not limited in this respect. Some embodiments pertain to 5G communications. Some embodiments relate to machine-type communications (MTC). Some embodiments relate to partitioning of bandwidth between MTC and other types of communications.

BACKGROUND

Machine-type communications (MTC) has become increasingly important, and the number of MTC devices has increased significantly in recent years. Some of these MTC devices are mission-critical and require a high level of reliable connectivity to support public safety applications or other applications. Nevertheless, MTC devices are expected to communicate with infrequent small-burst transmissions, and other non-MTC devices should be able to use as much bandwidth as possible without interfering with MTC operations, to provide wireless users with expected data rate levels.

BRIEF DESCRIPTION OF THE DRAWINGS

FIGS. 5A-5C illustrate multiplexing schemes for a physical downlink control channel (PDCCH) and a physical downlink shared channel (PDSCH) in accordance with some embodiments;

FIGS. 6A and 6B illustrate self-contained resource mapping of a PDCCH with secondary partitions in accordance with some embodiments;

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

Figure 1:
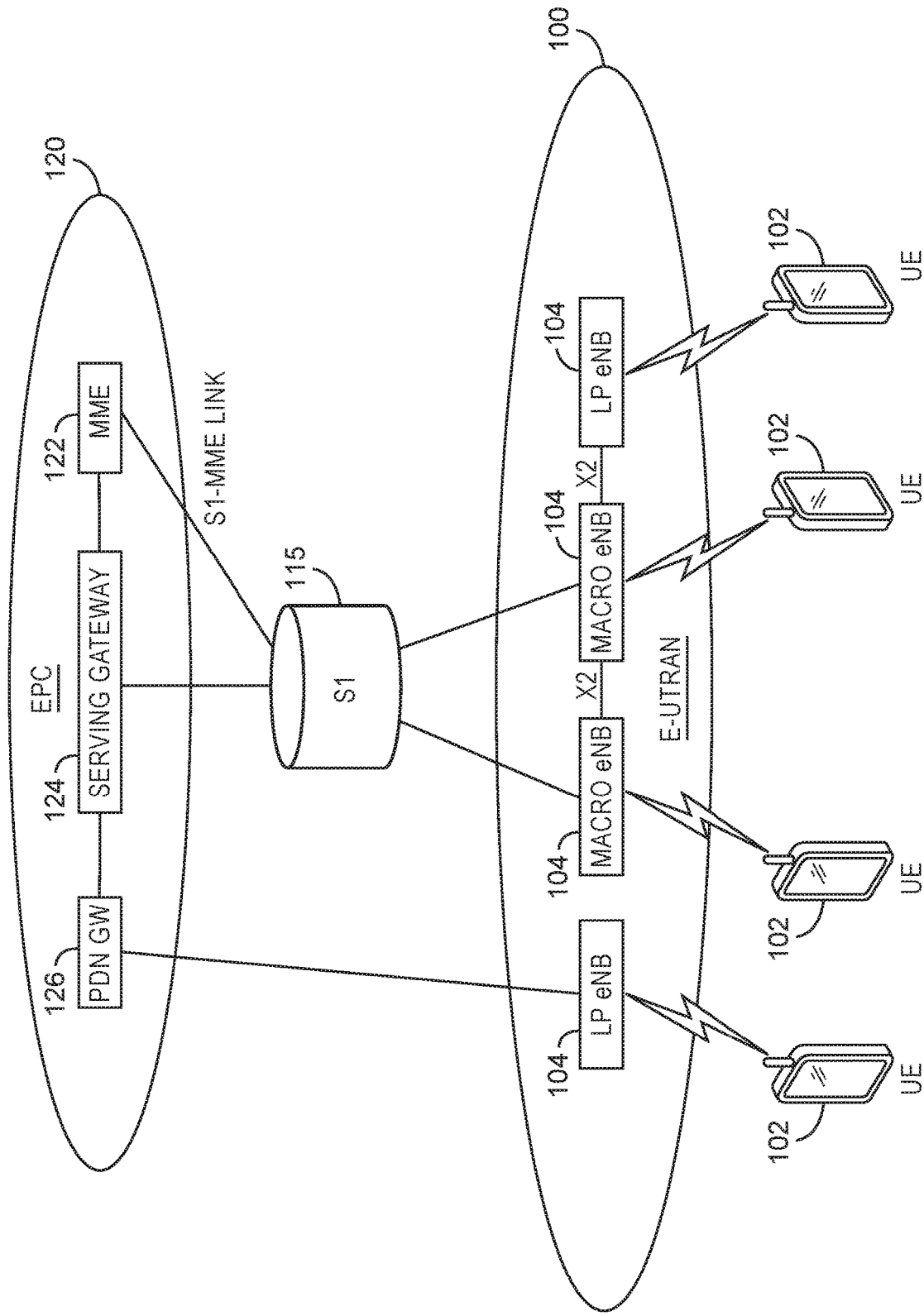
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which can operate as base stations) for communicating with User Equipment (UE) 102. The eNBs 104 can include macro eNBs and low power (LP) eNBs. In accordance with some embodiments, the eNB 104 can receive uplink data packets from the UE 102 on a Radio Resource Control (RRC) connection between the eNB 104 and the UE 102. The eNB 104 can transmit an RRC connection release message to the UE 102 to indicate a transition of the UE 102 to an RRC idle mode for the RRC connection. The eNB 104 can further receive additional uplink data packets according to the stored context information.

The MME 122 manages mobility aspects in access such as gateway selection and tracking area list management. The serving GW 124 terminates the interface toward the RAN 10, and routes data packets between the RAN 100 and the core network 120. In addition, it can be a local mobility anchor point for inter-eNB handovers and also can provide an anchor for inter-3GPP mobility. Other responsibilities may include lawful intercept, charging, and some policy enforcement. The serving GW 124 and the MME 122 can be implemented in one physical node or separate physical nodes. The PDN GW 126 terminates an SGi interface toward the packet data network (PDN). The PDN GW 126 routes data packets between the EPC 120 and the external PDN, and can be a key node for policy enforcement and charging data collection. It can also provide an anchor point for mobility with non-LTE accesses. The external PDN can be any kind of IP network, as well as an IP Multimedia Subsystem (IMS) domain. The PDN GW 126 and the serving GW 124 can be implemented in one physical node or separated physical nodes. Furthermore, the MME 122 and the Serving GW 124 can be collapsed into one physical node in which case the messages will be transferred with one less hop.

The eNBs 104 (macro and micro) terminate the air interface protocol and can be the first point of contact for a UE 102. In some embodiments, an eNB 104 can fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 can be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals can comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB can be implemented with a picocell eNB since it is coupled to a macro eNB via an X2 interface. Picocell eNBs or other LP eNBs can incorporate some or all functionality of a macro eNB. In some cases, this can be referred to as an access point, base station or enterprise femtocell.

In some embodiments, a downlink resource grid can be used for downlink transmissions from an eNB 104 to a UE 102, while uplink transmission from the UE 102 to the eNB 104 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The network frame structure and particular frame information (e.g., frame number) can depend on the Radio Access Technology (RAT) being used by the UE to connect with the network. For example, communication over an LTE network can be divided into 10 ms frames, each of which can contain ten 1 ms subframes. Each subframe of the frame, in turn, can contain two slots of 0.5 ms.

The smallest time-frequency unit in a resource grid is denoted as a resource element (RE). Each resource grid comprises a number of resource blocks (RBs), which describe the mapping of certain physical channels to resource elements. Each resource block comprises a collection of resource elements and in the frequency domain and can represent the smallest quanta of resources that currently can be allocated. There are several different physical downlink channels that are conveyed using such resource blocks.

The physical downlink shared channel (PDSCH) carries user data and higher-layer signaling to a UE 102. The physical downlink control channel (PDCCH) carries information about the transport format and resource allocations related to the PDSCH channel, among other things.

In some embodiments, the UE 102 may be configured to operate according to a Machine Type Communication (MTC) or Internet of Things (IoT) mode or protocol. As part of such operation, the UE 102 may exchange small quantities of data with the eNB 104 (or other device) at relatively infrequent rates. For instance, data blocks that include 100 bytes or fewer may be transmitted to the eNB 104 at a frequency of less than once per minute. The block size is not limited to 100 bytes, however, as other block sizes such as 20, 50, 200, 1000 or other number of bytes may be used in some cases. The frequency of transmission is also not limited to less than once per minute, as other frequency transmissions such as once per second, ten seconds, two minutes, ten minutes, one hour, one day or other period may be used in some cases.

There has been a recent trend of ever-increasing usage of MTC devices. Support for MTC is expected to be an important feature for 3GPP 5G systems and networks. MTC devices used for many applications will require low operational power consumption and are expected to communicate with infrequent small burst transmissions. Some MTC devices implement mission-critical applications (e.g., in the area of public safety) and accordingly require highly reliable connectivity with guaranteed low latency, availability and reliability-of-service. Other, non-MTC devices often expect very high data rates, which is also a driver in network development and evolution for 5G systems.

To address these and other concerns, a structure for Flexible RAT (e.g., "xRAT") has been proposed to define a unified framework for the support of diverse requirements, applications and services, multiple frequency bands, multiple application/services, licensed/unlicensed frequency, and multiple RATs.

Figure 2:
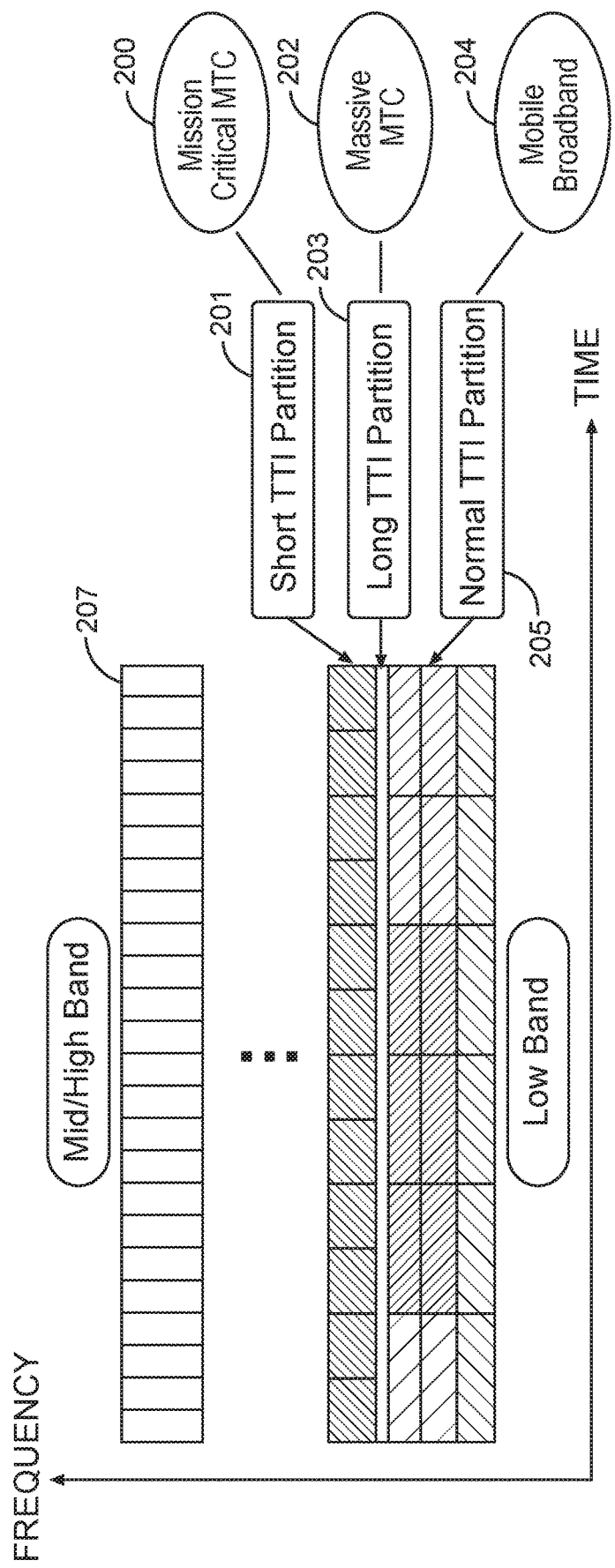
FIG. 2 illustrates a design framework for 3GPP LTE fifth-generation flexible radio access technologies (RAT) in accordance with some embodiments.

FIG. 2 illustrates a design framework for 3GPP LTE 5G xRAT in accordance with some embodiments. As shown in the figure, multiple RATs/sub-RATs/partitions or applications in different or same frequency resource or frequency bands can be multiplexed in either TDM, FDM, Code division multiplexing (CDM), or a combination of the above. For example, a mission-critical MTC application 201 may have short TTIs, in a short TTI partition 201 to enable low-latency usage. Long TTIs in a long TTI partition 203 can be used for massive MTC 202 in which large numbers of MTC devices are present, but the MTC devices are themselves delay-tolerant (e.g., some MTC devices, as described earlier, may only communicate once per minute, once per hour, once per day, or even less frequently). TTIs in a normal TTI partition 205 for mobile broadband applications 204 are shown by way of comparison as being longer (e.g., twice as long) as TTIs 201 for mid-range requirements in latency. Other partitions 207 can also be present. Embodiments as described herein are not limited to the partitions and TTI lengths shown in FIG. 2, nor are embodiments limited to any particular number of partitions. Embodiments can include one partitions (e.g., comprised of an entire system bandwidth) or any number of partitions.

Based on the proposed xRAT framework (e.g., the example xRAT framework shown in FIG. 2), it may be beneficial to dynamically allocate resources for different partitions which can be used for different applications or services. For example, MTC usage may vary depending on time of day.

Figure 3A:
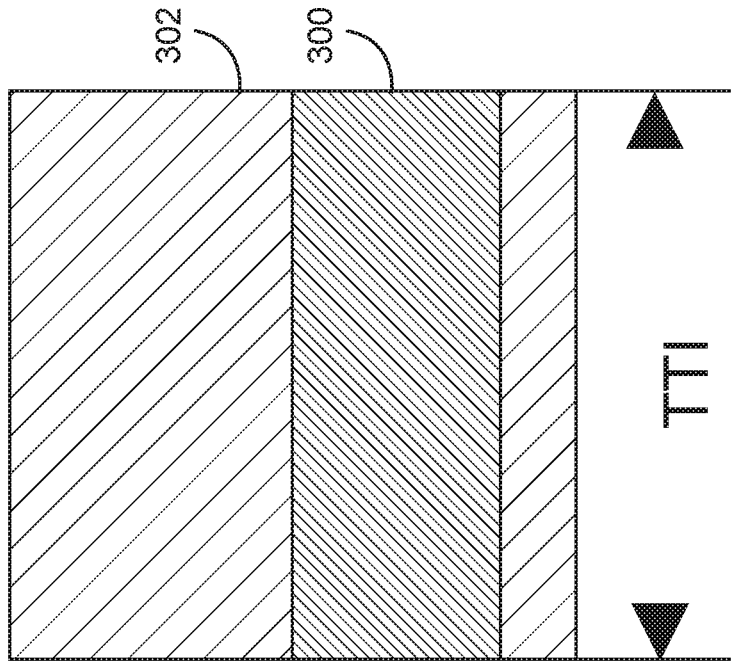
FIGS. 3A and 3B illustrate dynamic resource allocation (DRA) for massive machine-type communication (MTC) applications in accordance with some embodiments.
Figure 3B:
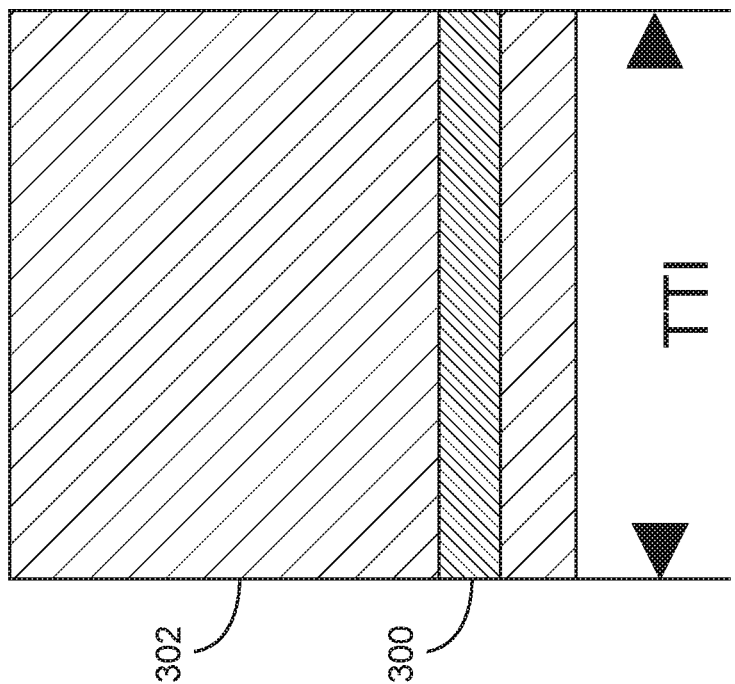

FIGS. 3A and 3B illustrate dynamic resource allocation (DRA) for massive machine-type communication (MTC) applications in accordance with some embodiments. Depending on the traffic, resources or sub-bands may be dynamically allocated for MTC applications. For example, as shown in FIG. 3A, the MTC system may be lightly loaded in one time period (e.g., during the daytime), so a smaller partition 300 (e.g., a secondary partition) may be used for MTC, with the rest of the bandwidth being allocated to the primary partition 302 for regular (e.g., non-MTC) communication. In contrast, as seen in FIG. 3B, during another time interval (e.g., at night) a larger secondary partition 300 may be allocated for MTC applications, leaving the primary partition 302 slightly smaller.

Embodiments, therefore, provide for dynamic resource allocation, such that different sizes for secondary partitions 300 (e.g., partitions for MTC communication) can be provided at various times (e.g., times of day or other periodicity) to vary with expected or observed MTC system loads. For example, the size (e.g., in PRBs) of a secondary partition 300 can be increased when a larger MTC system load is expected or observed. Embodiments may be used in particular for situations of massive MTC, to increase the overall resource allocation for MTC applications, rather than for mission-critical MTC that is more delay-sensitive, although embodiments are not limited to massive MTC usage.

Configuration Information for Resource Allocation of Partitions

In various embodiments, the entire system bandwidth can be considered as a candidate for partitioning into secondary and primary partitions, and accordingly a UE 102 can receive (and an eNB 104 can transmit) DRA messages for allocating a secondary partition in any portion of the entire system bandwidth. At least these embodiments can provide greater flexibility in partitioning. However, this flexibility may come with a tradeoff of greater signaling overhead, at least because no portion of the system bandwidth can be assumed to always be of the primary partition, and signaling overhead may be increased to notify UEs 102 of the existence or location of secondary partitions and primary partitions.

In other embodiments, the UE 102 will receive configuration information from an eNB 104 that indicates information for a sub-band, of the entire system bandwidth, for which the UE 102 can receive DRA messages allocating resources to a primary partition and a secondary partition of the sub-band. As described earlier herein, the secondary partition in the context of embodiments described herein can include allocations for MTC, and the primary partition includes allocations for communications other than MTC. Portions of the system bandwidth outside the sub-band are allocated to the primary partition.

The UE 102 can receive the configuration information in a master information block (MIB), a system information block (SIB) or in dedicated radio resource control (RRC) signaling, among other mechanisms described later herein. The eNB 104 may further indicate the resource allocation of different partitions within this configured bandwidth. By way of illustrate example, give a system bandwidth comprising 100 PRBs, PRBs from #0 to #24 may be allocated for dynamic resource allocation (DRA) of different partitions (e.g., primary partition and secondary partition), while the remaining PRBs are allocated for the primary partition. The eNB 104 can dynamically adjust the resources for secondary partitions within these configured 25 PRBs using DRA messaging as described, in accordance with various embodiments.

Further, the configuration information provided in the DRA messaging may only contain the resource allocation of the primary partition in some embodiments. In this case, the UE 102 may decode the control channel (e.g., PDCCH, ePDCCH, xPDDCH) in the primary partition to determine resource allocation information of the secondary partition. If the UE 102 is an MTC UE, the UE 102 may perform MTC communication in the secondary partition using the resource allocation information of the secondary partition that was retrieved through control channel decoding. These embodiments may be appropriate for delay tolerant applications, e.g., massive MTC applications, at least because it is necessary for the MTC UE 102 in these embodiments to decode a control channel to access secondary partition resources.

Alternatively, in some embodiments, the configuration information provided in the DRA messaging may contain the resource allocation of the secondary partitions, in addition to or instead of containing the resource allocation of the primary partitions. At least these embodiments may allow the UE 102 quicker access to the secondary partitions, which may be beneficial for delay sensitive applications, e.g. mission critical MTC such as public safety communications. In at least these embodiments, an MTC UE 102 can perform MTC communications within the secondary partition when the configuration information includes allocation information for the secondary partition. Otherwise, if the UE 102 is other than MTC, the UE 102 may refrain from performing communications in the secondary partition.

To reduce the signaling overhead, a resource sub-band can be defined, whereby each resource sub-band includes a number of PRBs, so that signaling is not performed for each individual PRB but rather for groups of PRBs. Further, the size of resource sub-band can be different depending on the system bandwidth. An example of the size of the resource sub-band is illustrated in the Table 1. Note that other examples of the resource sub-band sizes can be used, and therefore embodiments are not limited to the sub-band sizes, or possible system bandwidths, described in Table 1.

TABLE 1

Resource sub-band size.

| System bandwidth or configured partial system bandwidth | Resource sub-band size (PRBs) |
|---|---|
| 10 MHz | 3 |
| 15 MHz | 4 |
| 20 MHz | 8 |

The eNB 104 can indicate resource allocations within the primary partitions and secondary partitions using various mechanisms in accordance with various embodiments. In one example embodiment, the eNB 104 can transmit a bitmap that indicates the resource allocation of the primary partition, the secondary partition, or both the primary partition and the secondary partition. Given a system bandwidth BW, and K=sub-band size in PRBs, the number of resource sub-bands NSB for a partition can be given by:

$$N_{SB} = BW/K \quad (1)$$

The bitmap for expressing the allocations will therefore include $N_{SB}$ bits. A bit can have a value of "0" if, for example a corresponding sub-band is allocated to the secondary partition, and "1" if the corresponding sub-band is allocated to the primary partition. However, embodiments are not limited thereto and the bits can have opposite values to signify secondary partitions or primary partitions. For example, given $N_{SB}=4$, a bitmap "1101" indicates that resource sub-bands #0, #1, and #4 are allocated for the primary partition while resource sub-band #2 is allocated for the secondary sub-band. Accordingly, in the illustrated example for a 10 MHz system bandwidth or configured partial system bandwidth, the secondary partition would be allocated 3 PRBs (or 4 PRBs for a 15 MHz system bandwidth, and 8 PRBs for a 20 MHz bandwidth) with reference to Table 1. It will be appreciated, however, that embodiments are not limited to this illustrative example for determining secondary partition size or primary partition size. Further, in at least one embodiment, the eNB 104 can transmit a resource sub-band index to indicate the allocation of partitions. For example, given $N_{SB}=4$, transmitting bit "01" indicates that the resource sub-band #1 is allocated for a secondary partitions.

Figure 4:
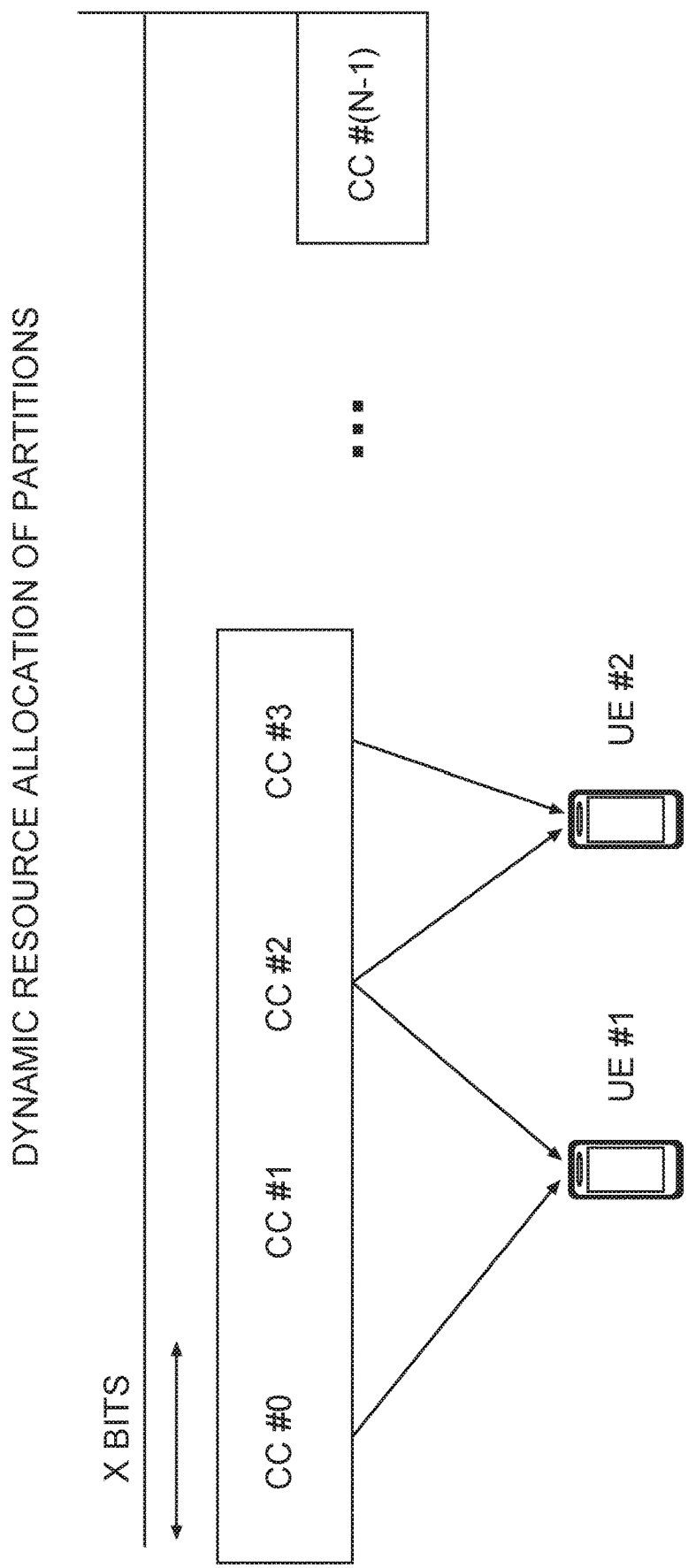
FIG. 4 illustrates a configuration of resource allocation of partitions in accordance with some carrier aggregation (CA) embodiments.

FIG. 4 illustrates a configuration of resource allocation of partitions in accordance with some carrier aggregation (CA) embodiments. In these embodiments allocation of partitions for component carriers (CC) are included in signaling from the eNB 104 in, e.g., the primary cell (PCell). As shown in FIG. 4, UE #1 obtains the information for resource allocation of the partitions for CC #0 and CC #2 while UE #2 obtains the information for CC #2 and CC #3. For each UE, the CC index(es) used for the DRA of partitions can be configured in a UE-specific manner via dedicated RRC signaling, although embodiments are not limited thereto.

Mechanisms to Indicate the Resource Allocation of Partitions

The eNB 104 (or other entity) can signal resource allocation of partitions using one or more of a variety of mechanisms described herein.

For example, as described earlier herein, resource allocation of different partitions can be indicated in an MIB. After successfully decoding the MIB, the UE 102 obtains the resource allocation for different partitions. In other embodiments, resource allocation of different partitions can be indicated in the SIB. In at least these embodiments, the UE 102 receive updates of the DRA within a broadcast control channel (BCCH) modification period, which is provided by higher layers. A UE 102 may be informed of updates via a paging message including a SystemInfoModification flag. Use of these embodiments may be appropriate when resource allocation of different partitions is updated semi-statically.

In some embodiments, resource allocation of different partitions can be indicated in a control channel (e.g., PDCCH, ePDCCH, xPDCCH, etc.). Resource allocation and configuration information for DRA will be indicated in the control channel using one of different mechanisms as described later herein, depending on the specific multiplexing scheme between control channels and shared channels.

In some embodiments, resource allocation of different partitions can be indicated in a dedicated control channel in the downlink. Because only limited information can be carried in the dedicated control channel, the size of configuration information may be small. Accordingly, the dedicated control channel may carry configuration information of resource allocation of partitions for only the serving cell. Dedicated control channel design is described in more detail later herein.

In some embodiments, the aforementioned mechanisms can be combined to indicate the resource allocation of different partitions. In one example, an eNB 104 can use a dedicated control channel to signal partial information of resource allocation of partitions, while another (e.g., non-dedicated) control channel may be used to signal remaining information. A UE 102 may first detect whether the dedicated control channel is updated. If the information is changed, the UE 102 may subsequently decode the corresponding control channel (e.g., PDCCH, ePDCCH, xPDCCH, etc.) for the detailed resource allocation of partitions.

xPDCCH Design for Dynamic Resource Allocation of Partitions

FIGS. 5A-5C illustrate multiplexing schemes for a physical downlink control channel (PDCCH) and a physical downlink shared channel (PDSCH) in accordance with some embodiments. As shown in FIG. 5A, a control channel 500 can be TDM with a shared channel 502. As shown in FIG. 5B, a control channel 500 can be FDM with a shared channel 502. As shown in FIG. 5C, a control channel 500 can be both TDM and FDM with a shared channel (e.g., the control channel and shared channel can be multiplexed in a hybrid mode).

In embodiments for which the control channel and shared channel are multiplexed in a TDM manner (e.g., as shown in FIG. 5A), a self-contained control channel design may be implemented to avoid the collision between control channel and sub-band allocations for secondary partitions. In particular, the resource for the transmission of self-contained control channels may not overlap with that for secondary partitions.

FIGS. 6A and 6B illustrate self-contained resource mapping of a PDCCH with secondary partitions in accordance with some embodiments. In FIG. 6A, the self-contained control channel (e.g., PDCCH, ePDCCH, xPDCCH, etc.) 600 is transmitted in the central PRBs within the bandwidth and spans the initial OFDM symbols within one transmission time interval TTI. An example secondary partition 602 is also shown. In FIG. 6B, the self-contained control channel (e.g., PDCCH, ePDCCH, xPDCCH, etc.) 600 is distributed in PRBs in the initial OFDM symbols, again avoiding a secondary partition 602.

In embodiments for which the control channel and shared channel are multiplexed in a FDM manner (FIG. 5B) or a hybrid mode (FIG. 5C) a control channel with a common search space can be used to signal the configuration information for resource allocation of different partitions. Similarly, the resource allocated for the transmission of the control channel (e.g., PDCCH, ePDCCH, xPDCCH, etc.) with common search space may not overlap with that for secondary partitions.

In these and other embodiments, a DCI format that includes at least information regarding the dynamic resource allocation of the primary or secondary partitions can be provided. This DCI format can include other information, for example, dynamic DL/UL configurations in the TDD system or control channel common search space configuration can be carried in the same DCI format, by way of nonlimiting example.

Figure 7A:
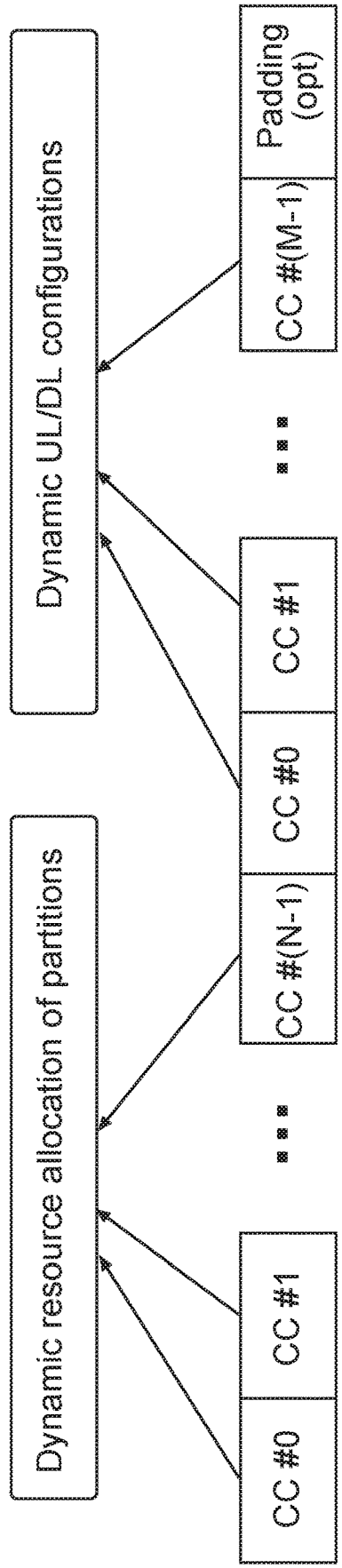
FIGS. 7A and 7B illustrate downlink control information (DCI) format structures in accordance with some embodiments.
Figure 7B:
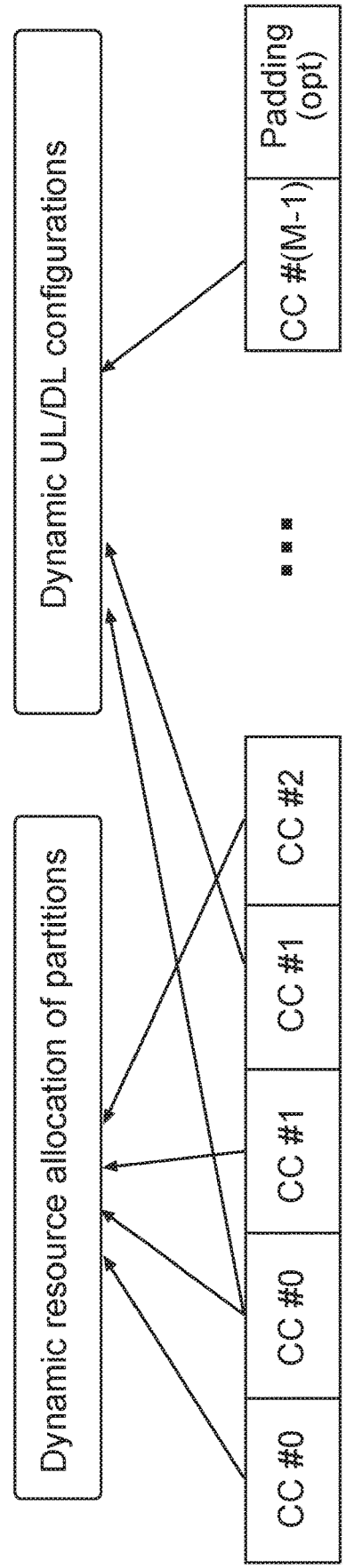

FIGS. 7A and 7B illustrate downlink control information (DCI) format structures in accordance with some embodiments. In FIG. 7A, the bit fields for dynamic resource allocations of partitions for N CCs are followed by similar bit fields for dynamic UL/DL configurations for M CCs. In contrast, in FIG. 7B, the bit fields for dynamic resource allocation of partitions and UL/DL configurations for CC #0 are followed by corresponding bit fields for CC #1, and so on. Note that the CC index(es) for each UE used for the dynamic resource allocation of partitions and UL/DL configurations can be signaled in a UE specific manner via dedicated RRC signaling. Further, to avoid excessive blind decoding attempts, zero padding may be used in some embodiments for the proposed DCI format to match other DCI format(s). Similar design principles of the above-described embodiments can be extended to include other information in the DCI format, and embodiments are not limited to providing only DRA and dynamic UL/DL configurations in the DCI format described in FIGS. 7A-7B.

Further, a radio network temporary identifier (RNTI) (e.g., DRA-RNTI) can be defined in 3GPP LTE specifications (e.g., 3GPP LTE 5G specifications and later versions) for the transmission of control channels as described herein, wherein the cyclic redundancy code (CRC) of the control channel is scrambled by DRA-RNTI. Accordingly, a UE 102 can decode the control channel with a CRC scrambled by this RNTI (e.g., DRA-RNTI). This DRA-RNTI can be predefined or configured by higher layers via MIB, SIB, dedicated RRC signaling, etc.

The UE 102 can monitor for the control channel (e.g., PDCCH, ePDCCH, xPDCCH, etc.) in subframes specified according to a periodicity parameter provided in upper-layer signaling. To control the timescale of dynamic resource allocation of different partitions, the periodicity of the control which contains the resource information of primary or secondary partitions can be configured in some embodiments. Such timescale control can also assist in reducing power consumption in that a UE 102 will only monitor certain subframe for a control channel with CRC scrambled by DRA-RNTI.

In at least some embodiments, the subframes that the UE 102 will monitor for a control channel with a CRC scrambled by DRA-RNTI can be defined in the downlink subframes or in special subframes in a TDD system satisfying:

$$\left(10 \times n_f + \left\lfloor \frac{n_s}{2} \right\rfloor - N_{OFFSET,DRA}\right) \bmod DRA_{periodicity} = 0 \quad (2)$$

where $n_f$ and $n_s$ are radio frame numbers and slot numbers, respectively; $N_{OFFSET,DRA}$ and $DRA_{PERIODICITY}$ are the subframe offset and periodicity of the control channel transmission with CRC scrambled by DRA-RNTI, respectively.

By way of nonlimiting example, in some embodiments, $N_{OFFSET,DRA}$ and $DRA_{PERIODICITY}$ can be defined according to $I_{DRA}$ which is given by Table 2. Further, configuration index $I_{DRA}$ can be predefined or configured by higher layers via MIB, SIB, or dedicated RRC signaling.

TABLE 2

Periodicity and subframe offset configuration for control channel with CRC scrambled by DRA-RNTI.

| Configuration Index $I_{DRA}$ | Periodicity $DRA_{PERIODICITY}$ in milliseconds | Subframe offset $N_{OFFSET,DRA}$ |
|---|---|---|
| 0-4 | 5 | $I_{DRA}$ |
| 5-14 | 10 | $I_{DRA}$-5 |
| 15-34 | 20 | $I_{DRA}$-15 |
| 35-74 | 40 | $I_{DRA}$-35 |
| 75-154 | 80 | $I_{DRA}$-75 |

In other embodiments, the periodicity, (e.g., $DRA_{PERIODICITY}$) for the control channel with CRC scrambled by DRA-RNTI can be predefined or configured by higher layers via MIB, SIB or dedicated RRC signaling. Further, within this configured periodicity, the UE 102 may monitor a set of subframes for the control channel with CRC scrambled by DRA-RNTI.

For example, a subframe bit map with parameter (e.g., "subframeBitMap") can be transmitted by the eNB 104 or other entity to signal the subframes that the UE 102 shall monitor for a control channel with CRC scrambled by DRA-RNTI, which can be repeated within the configured periodicity. By way of illustrative example, subframeBitMap could have a value "0011000011" and a configured periodicity in subframes can be set to 20. In this illustrative example, the first and second radio frames have the same subframe bit map, and subframes #2, #3, #8 and #9 in each frame are allocated for the transmission of a control channel with CRC scrambled by DRA-RNTI. Embodiments are not limited to any particular size or configuration of the subframe bitmap or to any particular periodicity. As with $DRA_{PERIODICITY}$, subframeBitMap can be predefined or configured by higher layers via MIB, SIB, or dedicated RRC signaling.

Dedicated Control Channel Design for Resource Allocation of Partitions

Figure 8:
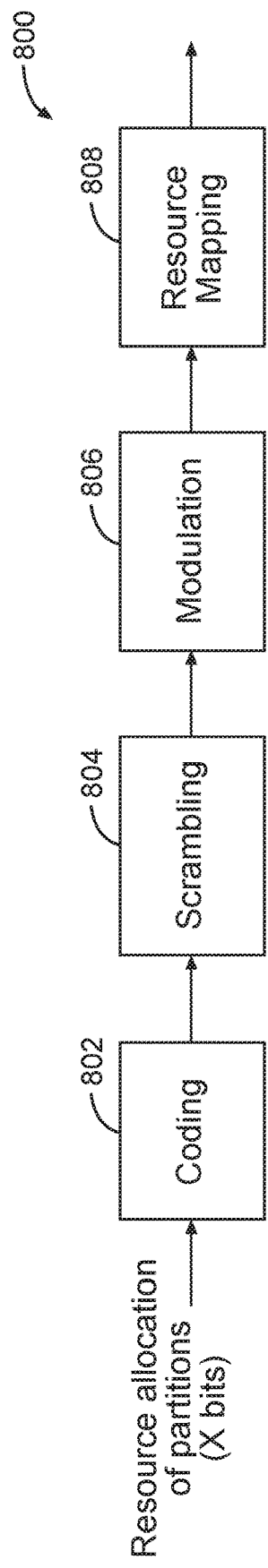
FIG. 8 illustrates operations of a method for generation of a dedicated control channel in accordance with some embodiments.

As described earlier herein, dedicated control channels are expected to only be able to carry limited amounts of information. Accordingly, the configuration of resource allocation of partitions provided in dedicated control channels may only include these for the serving cell. FIG. 8 illustrates operations of a method 800 for generation of a dedicated control channel. In the example, a resource allocation, expressed in bits, is provided for encoding at block 802. In block 802, a block coding is adopted for the resource allocation of the partitions, i.e., X bits. In one example, the block coding scheme can be based on the channel coding for control frame indicators (CFI) according to 3GPP LTE specifications in current or later versions thereof (e.g., 3GPP TS 36.212). In another example, the block coding scheme can be based on the Reed-Miller code used for the physical uplink control channel (PUCCH) format 2.

The dedicated control channel is scrambled at operation 804 to minimize interference. More specifically, the scrambling seed can be defined as a function of a physical cell ID and/or a virtual cell ID and/or subframe/slot/symbol index for the transmission of dedicated control channel. In one example, the scrambling seed can be given by:

$$c_{init} = \left(\left[\frac{n_s}{2}\right]+1\right) \cdot (2N_{cell}^{ID}+1) \cdot 2^9 + N_{cell}^{ID} \quad (3)$$

where $n_s$ is the slot index and $N_{cell}^{ID}$ is the cell ID.

Modulation is performed at 806 (using, e.g., binary phase shift keying (BPSK) or offset quadrature phase shift keying (QPSK), although embodiments are not limited thereto). Dedicated control channel resources are then mapped in operation 808, and as illustrated later herein. While only resource allocation is provided as an input in the example of FIG. 8, other information can be combined at the input, for instance, size of control region, common control channel configuration, etc. Further, the periodicity and subframes for the transmission of dedicated control channel can be configured according to operations described earlier herein for other control channels (e.g., non-dedicated control channels).

In at least some embodiments, the dedicated control channel is transmitted in the first symbol within a configured subframe. Given N as the number of modulated symbols for the dedicated control channel, and given that N symbols are divided into K groups, wherein each group includes M=N/K symbols or subcarriers, embodiments can exploit frequency diversity by separating the K groups within the system bandwidth. For example, the frequency distance between two groups can be given by $$\frac{N_{sc}}{K}$$

where $N_{sc}$ is the number of subcarriers within the system bandwidth. Further, to avoid collisions between dedicated control channel transmissions in neighboring cells, the location of the K groups in the frequency domain can be made to depend on the physical layer cell identity.

Figure 9:
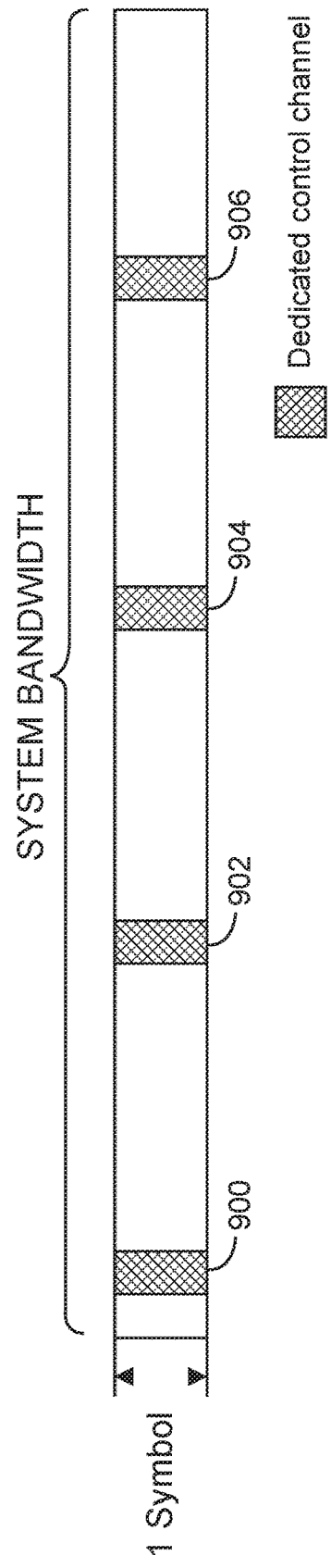
FIG. 9 illustrates resource mapping for a dedicated control channel in accordance with various embodiments.

FIG. 9 illustrates resource mapping for a dedicated control channel in accordance with various embodiments as can be generated according to operation 808 of example method 800 (FIG. 8). In the example of FIG. 9, K=4 (e.g., there are four groups 900, 902, 904 and 906 of symbols for dedicated control channel). Further, the starting frequency position of the dedicated control channel transmission can be made to depend on the physical cell identifier.

Figures 10A, 10B, 10C:
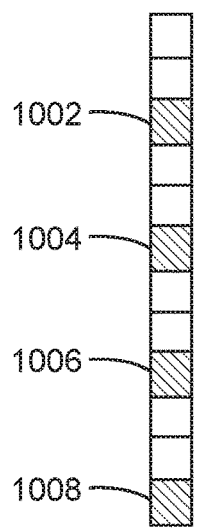
FIGS. 10A-10C illustrate resource mapping for data and reference symbols in accordance with various embodiments.

It will be appreciated that, in order to allow proper channel estimation and coherent detection by a UE 102, reference symbols (RS) will be inserted within each group for the transmission of the dedicated control channel. The RSs can be based on cell-specific RS (e.g., CRS) or DeModulation RS (DM-RS). FIGS. 10A-10C illustrate resource mapping for data and reference symbols in accordance with various embodiments. FIGS. 10A-10C give various configurations using different numbers of RSs. For example, FIG. 10A gives four RSs 1002, 1004, 1006 and 1008, FIG. 10B gives different groupings and numbers of RSs than FIG. 10A (e.g., 8 RSs are given in the example of FIG. 10B). FIG. 10C shows yet another number of RSs (e.g., 6 RSs).

Alternatively, some embodiments may allow non-coherent detection at the UE 102. In at least these embodiments, an RS may not be used or transmitted. More specifically, the modulated symbols occupy the entire resource allocated to the dedicated control channel.

In another embodiment, the dedicated control channel is transmitted within central PRBs relative to the system bandwidth. Further, the dedicated control channel may be transmitted adjacent to PSS/SSS/PBCH. Depending on the payload size of the dedicated control channel, the dedicated control channel may span a number Q of symbols (e.g., 1 symbol or 2 symbols) within one subframe.

Figure 11:
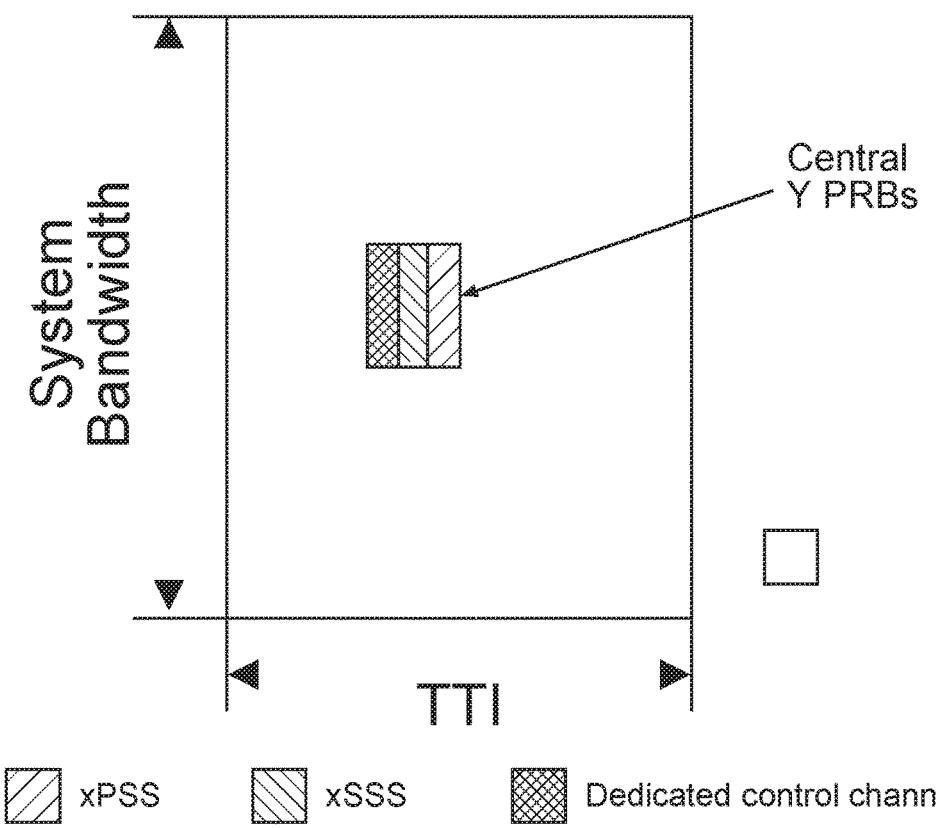
FIG. 11 illustrates resource mapping for a dedicated control channel in accordance with various embodiments.

FIG. 11 illustrates resource mapping for a dedicated control channel in accordance with various embodiments. In FIG. 11, the dedicated control channel is transmitted prior to PSS and SSS. Note that other resource mapping schemes can be extended from the example as shown in FIG. 11. For instance, the dedicated control channel can be transmitted after PSS/SSS/PBCH.

Regarding the RS resource mapping, the options as shown in FIGS. 10A-10C can be adopted. Alternatively, the UE 102 may rely on the PSS (e.g., PSS or xPSS), SSS (e.g., SSS or xSSS) and/or PBCH (e.g., PBCH or xPBCH) RS for the channel estimation for the dedicated control channel. In this case, the precoder applied for the transmission of PSS/SSS and/or PBCH is same as that for the transmission of dedicated control channel.

Apparatuses for Performing Various Embodiments

Figure 12:
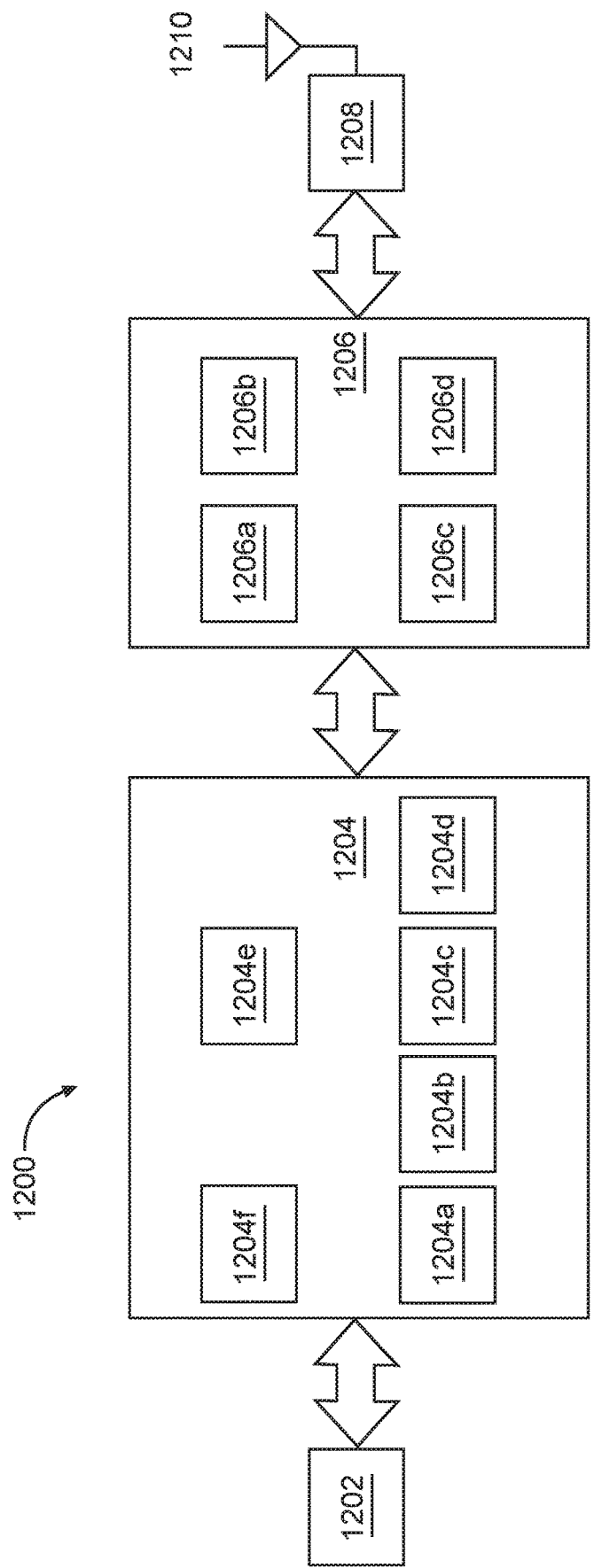
FIG. 12 is a functional diagram of a User Equipment (UE) in accordance with some embodiments.

FIG. 12 is a functional diagram of a User Equipment (UE) 1200 in accordance with some embodiments. The UE 1200 may be suitable for use as a UE 102 as depicted in FIG. 1. In some embodiments, the UE 1200 may include application circuitry 1202, baseband circuitry 1204, Radio Frequency (RF) circuitry 1206, front-end module (FEM) circuitry 1208 and one or more antennas 1210, coupled together at least as shown. In some embodiments, other circuitry or arrangements may include one or more elements and/or components of the application circuitry 1202, the baseband circuitry 1204, the RF circuitry 1206 and/or the FEM circuitry 1208, and may also include other elements and/or components in some cases. As an example, "processing circuitry" may include one or more elements and/or components, some or all of which may be included in the application circuitry 1202 and/or the baseband circuitry 1204. As another example, "transceiver circuitry" may include one or more elements and/or components, some or all of which may be included in the RF circuitry 1206 and/or the FEM circuitry 1208. These examples are not limiting, however, as the processing circuitry and/or the transceiver circuitry may also include other elements and/or components in some cases.

In embodiments, the processing circuitry can configure the transceiver circuitry to receive configuration information from an eNB (e.g., eNB 104, FIG. 1). The configuration information can indicate information for a sub-band of a system bandwidth, for which the UE is to receive DRA messages allocating resources to a primary partition and a secondary partition of the sub-band. As described earlier herein, the secondary partition can include allocations for MTC, and the primary partition can include allocations for other than MTC, and portions of the system bandwidth outside the sub-band are typically allocated to the primary partition in most embodiments.

The processing circuitry can configure the transceiver circuitry to perform MTC communications within the secondary partition when the configuration information includes allocation information for the secondary partition and the UE 102 is a MTC UE. Otherwise, if the UE 102 is other than MTC, the processing circuitry can configure the transceiver circuitry to refrain from performing communications in the secondary partition.

The processing circuitry can configure the transceiver circuitry to receive other channels such as a downlink shared channel (e.g., PDSCH) from the eNB 104. The downlink shared channel can be TDM with the control channel. The downlink shared channel can additionally or alternatively be FDM with the control channel. The processing circuitry can process the control channel and the downlink shared channel according to any methods or criteria described in standards for wireless communication.

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1204 may include circuitry such as, but not limited to, one or more single-core or multi-core processors. The baseband circuitry 1204 may include one or more baseband processors and/or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a second generation (2G) baseband processor 1204a, third generation (3G) baseband processor 1204b, fourth generation (4G) baseband processor 1204c, and/or other baseband processor(s) 1204d for other existing generations, generations in development or to be developed in the future (e.g., fifth generation (5G), 6G, etc.). The baseband circuitry 1204 (e.g., one or more of baseband processors 1204a-d) may handle various radio control functions that enable communication with one or more radio networks via the RF circuitry 1206. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, and/or constellation mapping/demapping functionality. In some embodiments, encoding/decoding circuitry of the baseband circuitry 1204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1204e of the baseband circuitry 1204 may be configured to run elements of the protocol stack for signaling of the PHY, MAC, RLC, PDCP and/or RRC layers. In some embodiments, the baseband circuitry may include one or more audio digital signal processor(s) (DSP) 1204f. The audio DSP(s) 1204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the RF circuitry 1206 may include a receive signal path and a transmit signal path. The receive signal path of the RF circuitry 1206 may include mixer circuitry 1206a, amplifier circuitry 1206b and filter circuitry 1206c. The transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect. In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c. The filter circuitry 1206c may include a low-pass filter (LPF), although the scope of the embodiments is not limited in this respect.

In some embodiments, the mixer circuitry 1206a of the receive signal path and the mixer circuitry 1206a of the transmit signal path may include two or more mixers and may be arranged for quadrature downconversion and/or upconversion respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct downconversion and/or direct upconversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206. In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider. The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer. In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210. In some embodiments, the UE 1200 may include additional elements such as, for example, memory/storage, display, camera, sensor, and/or input/output (I/O) interface.

Figure 13:
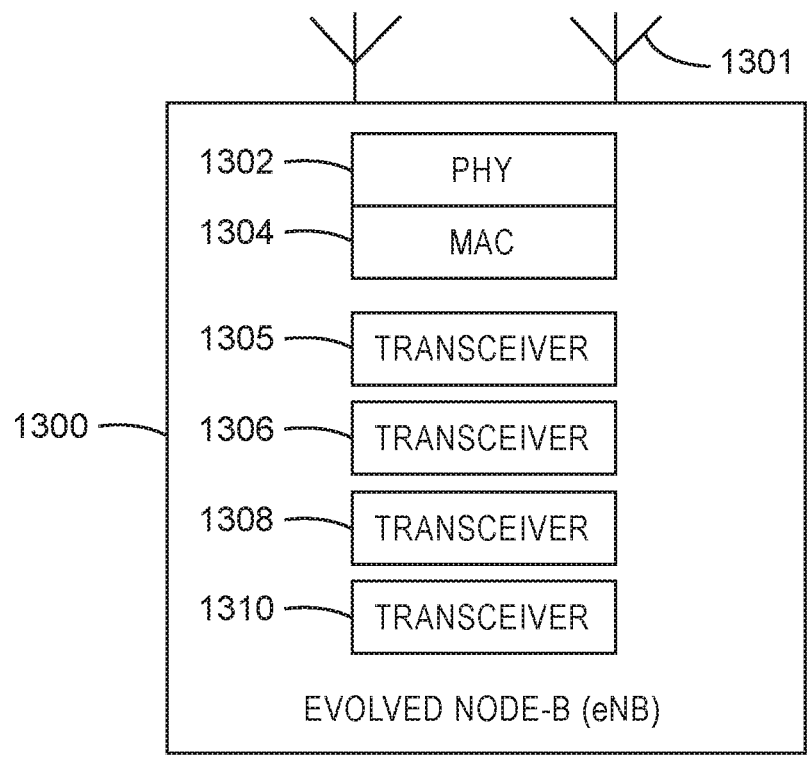
FIG. 13 is a functional diagram of an Evolved Node-B (eNB) in accordance with some embodiments.

FIG. 13 is a functional diagram of an Evolved Node-B (eNB) 1300 in accordance with some embodiments. It should be noted that in some embodiments, the eNB 1300 may be a stationary non-mobile device. The eNB 1300 may be suitable for use as an eNB 104 as depicted in FIG. 1. The eNB 1300 may include physical layer circuitry 1302 and a transceiver 1305, one or both of which may enable transmission and reception of signals to and from the UE 1200, other eNBs, other UEs or other devices using one or more antennas 1301. As an example, the physical layer circuitry 1302 may perform various encoding and decoding functions that may include formation of baseband signals for transmission and decoding of received signals. As another example, the transceiver 1305 may perform various transmission and reception functions such as conversion of signals between a baseband range and a Radio Frequency (RF) range. Accordingly, the physical layer circuitry 1302 and the transceiver 1305 may be separate components or may be part of a combined component. In addition, some of the functionality described may be performed by a combination that may include one, any or all of the physical layer circuitry 1302, the transceiver 1305, and other components or layers. In some embodiments, the transceiver 1305 can identify load conditions for machine-type communications (MTC) in a cell served by the eNB 1300. In some embodiments, the transceiver 1305 can transmit configuration information to a UE 102 that indicates the size of a sub-band, of a system bandwidth for at least one component carrier (CC), for which the UE 102 is to receive DRA messages allocating resources to a primary partition and a secondary partition of the sub-band. The size of the secondary partition, of the sub-band, or of the primary partition (among other parameters), can be determined based on load conditions for MTC in the cell served by the eNB 104, or by other cells. The transceiver circuitry 1305 can transmit, to a UE (e.g., UE 102, FIG. 1), a control channel occupying an initial number of OFDM symbols of a downlink subframe. A value for the initial number of OFDM symbols can be signaled to the UE in one or more of a MIB or SIB, or within RRC signaling, or within a PCFICH, by way of nonlimiting example.

The eNB 1300 may also include medium access control layer (MAC) circuitry 1404 for controlling access to the wireless medium. The eNB 1300 may also include processing circuitry 1406 and memory 1408 arranged to perform the operations described herein. The eNB 1300 may also include one or more interfaces 1410, which may enable communication with other components, including other eNBs 104 (FIG. 1), components in the EPC 120 (FIG. 1) or other network components. In addition, the interfaces 1410 may enable communication with other components that may not be shown in FIG. 1, including components external to the network. The interfaces 1410 may be wired or wireless or a combination thereof.

The antennas 1210, 1301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 1210, 1301 may be effectively separated to take advantage of spatial diversity and the different channel characteristics that may result.

In some embodiments, the UE 1200 or the eNB 1300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 1200 or eNB 1300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 1200, eNB 1300 or other device may include one or more of a keyboard, a display, a non-volatile memory port, multiple antennas, a graphics processor, an application processor, speakers, and other mobile device elements. The display may be an LCD screen including a touch screen.

Figure 14:
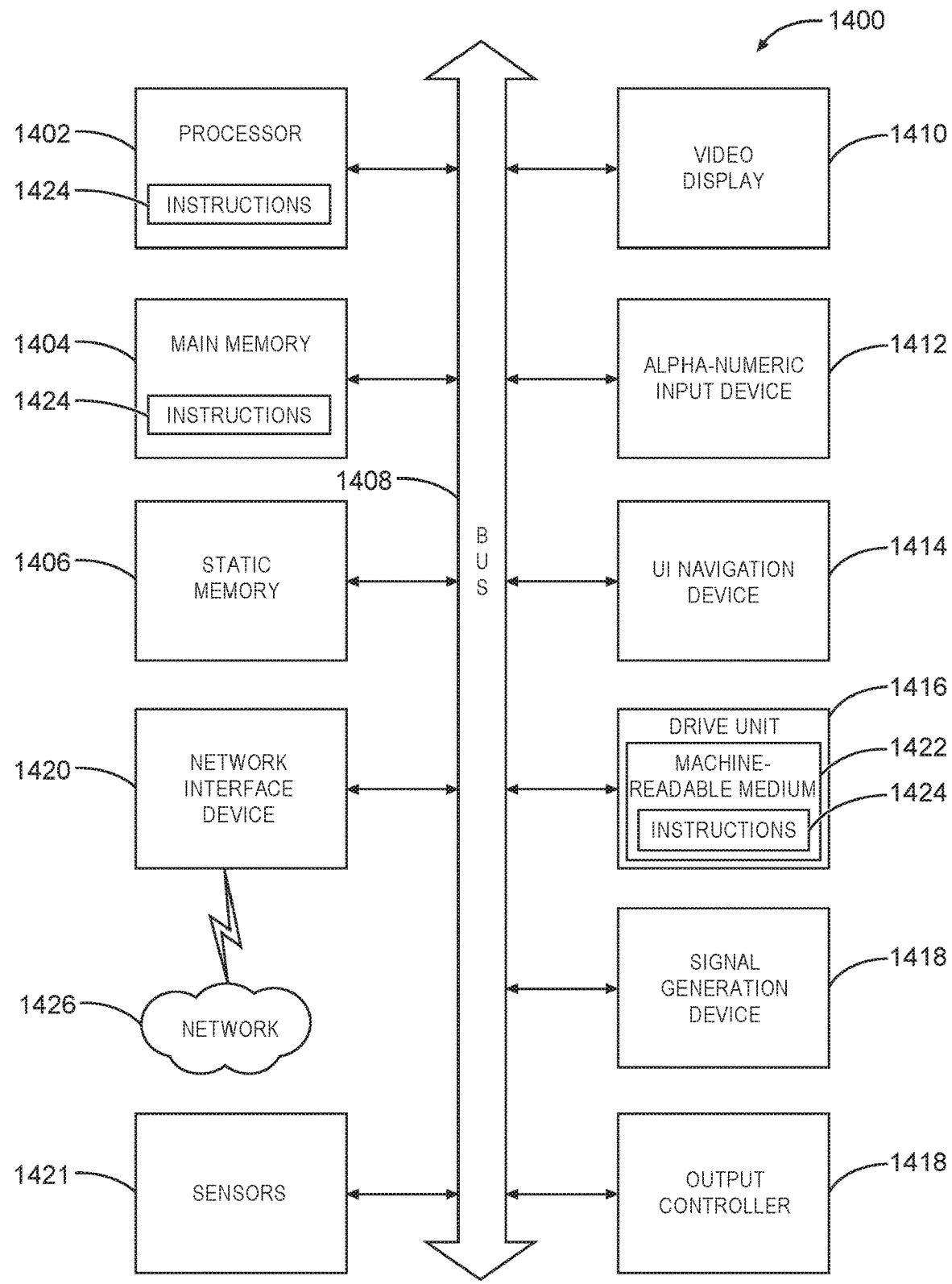
FIG. 14 is a block diagram illustrating components of a machine, according to some example embodiments, able to read instructions from a machine-readable medium and perform any one or more of the methodologies discussed herein, according to aspects of the disclosure.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a UE, eNB, MME, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424. When the machine 1400 operates as a UE, the machine readable medium 1422 can instruct one or more processors of the UE to receive configuration information from an eNB (e.g., eNB 104, FIG. 1), the configuration information indicating size, in physical resource blocks (PRBs), and location within a system bandwidth, for a sub-band within the system bandwidth that is to be considered for dynamic resource allocation (DRA) of resources of the sub-band to a secondary partition configured to support machine-type communications (MTC), portions of the sub-band outside the secondary partition being allocated to a primary partition for other than MTC; and perform MTC communications within the secondary partition when the configuration information includes allocation information for the secondary partition and the UE is a MTC UE, otherwise, if the UE is other than MTC, refrain from performing communications in the secondary partition.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" shall be taken to include any intangible medium that is capable of storing, encoding or carrying instructions for execution by the machine 1400, and includes digital or analog communications signals or other intangible medium to facilitate communication of such software.

To better illustrate the apparatuses, systems, and methods disclosed herein, a non-limiting list of examples is provided herein:

In Example 1, an apparatus for a User Equipment (UE), the apparatus comprising transceiver circuitry and hardware processing circuitry, the hardware processing circuitry to configure the transceiver circuitry to: receive configuration information from an Evolved Node-B (eNB), the configuration information indicating information for a sub-band of a system bandwidth, for which the UE is to receive dynamic resource allocation (DRA) messages allocating resources to a primary partition and a secondary partition of the sub-band, the secondary partition including allocations a first communication type, the primary partition including allocations for a second communication type, and wherein portions of the system bandwidth outside the sub-band are allocated to the primary partition; and perform communications of the first communication type within the secondary partition when the configuration information includes allocation information for the secondary partition and the UE is configured for the first communication type.

In Example 2, the subject matter of Example 1 can optionally include wherein the first communication type is machine-type communications (MTC) and the second communication type is other than MTC.

In Example 3, the subject matter of Example 2 can optionally include wherein the hardware processing circuitry is to further configure the transceiver circuitry to: if the UE is other than MTC, refrain from performing communications in the secondary partition, and decode the control channel in the primary partition to determine resource allocation information of the secondary partition, and, when the UE is an MTC UE, perform MTC communication in the secondary partition using the resource allocation information of the secondary partition, and wherein the configuration information for the sub-band is devoid of resource allocation information.

In Example 4, the subject matter of any of Examples 1-2 can optionally include wherein the hardware processing circuitry is further configured to decode the control channel with a cyclic redundancy code (CRC) scrambled by a DRA-specific radio network temporary identifier (DRA-RNTI).

In Example 5, the subject matter of any of Examples 1-4 can optionally include wherein the hardware processing circuitry is configured to monitor for the control channel in subframes specified according to a periodicity parameter provided in upper-layer signaling.

In Example 6, the subject matter of any of Examples 1-5 can optionally include wherein the configuration information is received in a system information block (SIB).

In Example 7, the subject matter of Example 6 can optionally include wherein the hardware processing circuitry further configures the transceiver circuitry to: receive updates of the DRA within a broadcast control channel (BCCH) modification period.

In Example 8, the subject matter of any of Example 1-7 can optionally include wherein the configuration information is received in UE-specific radio resource control (RRC) signaling.

In Example 9, the subject matter of any of Examples 1-8 can optionally include wherein the configuration information is received in a master information block (MIB).

In Example 10, the subject matter of any of Examples 1-9 can optionally include wherein the UE is to receive DRA messages for allocating a secondary partition in any portion of the entire system bandwidth.

In Example 11, the subject matter of any of Examples 1-10 can optionally include wherein the hardware processing circuitry further configures the transceiver circuitry to: receive allocation information allocating at least a set of physical resource blocks (PRBs) within the sub-band to the secondary partition.

In Example 12, the subject matter of any of Examples 1-11 can optionally include wherein hardware processing circuitry further configures the transceiver circuitry to: receive a downlink shared channel that is time division multiplexed (TDM) or frequency division multiplexed (FDM) with the control channel, and wherein the control channel includes at least an initial orthogonal frequency-division multiplexing (OFDM) symbol of a subframe, and further wherein the control channel is outside the secondary partition; and process the downlink shared channel to receive other than MTC data.

In Example 13, the subject matter of any of Examples 1-12 can optionally include wherein the configuration information includes configuration information for partitions of multiple component carriers (CCs).

In Example 14, a machine readable medium stores instructions for execution by one or more processors to perform operations for communication by a User Equipment (UE), the operations to configure the one or more processors to: receive configuration information from an Evolved Node-B (eNB), the configuration information indicating size, in physical resource blocks (PRBs), and location within a system bandwidth, for a sub-band within the system bandwidth that is to be considered for dynamic resource allocation (DRA) of resources of the sub-band to a secondary partition configured to support machine-type communications (MTC), portions of the sub-band outside the secondary partition being allocated to a primary partition for other than MTC; and perform MTC communications within the secondary partition when the configuration information includes allocation information for the secondary partition and the UE is a MTC UE, otherwise, if the UE is other than MTC, refrain from performing communications in the secondary partition.

In Example 15, the subject matter of Example 14 can optionally include wherein the operations further configure the one or more processors to: receive allocation information allocating at least a set of PRBs within the sub-band to the secondary partition, wherein the set of PRBs includes a number of PRBs defined based on the size of system bandwidth.

In Example 16, the subject matter of Example 15 can optionally include wherein the operations further configure the one or more processors to: receive allocation information for a plurality of sets of PRBs within the sub-band, wherein the number of sets in the plurality of sets is based on the size of system bandwidth and the number of PRBs in each set of the plurality of sets, and wherein the allocation information includes a bitmap indicating which sets of the plurality of sets are allocated to the secondary partition and which sets of the plurality of sets are allocated to the primary partition.

In Example 17, the subject matter of any of Examples 14-16 can optionally include wherein the configuration information does not include identification of the resource allocation of the secondary partition, and the operations further configure the one or more processors to decode the control channel in the primary partition to determine resource allocation information of the secondary partition, and, when the UE is an MTC UE, perform MTC communication in the secondary partition using the resource allocation information of the secondary partition.

In Example 18, the subject matter of any of Examples 14-17 can optionally include wherein hardware processing circuitry further configures the transceiver circuitry to: receive a downlink shared channel that is time division multiplexed (TDM) with the control channel, wherein the control channel includes at least an initial orthogonal frequency-division multiplexing (OFDM) symbol of a subframe, and wherein the control channel includes a dedicated control channel for providing resource allocations for the primary partition and the secondary partition; and process the downlink shared channel and the dedicated control channel.

Example 19 includes an apparatus for an Evolved Node-B (eNB), the apparatus comprising hardware processing circuitry and transceiver circuitry, the hardware processing circuitry to configure the transceiver circuitry to: identify load conditions for machine-type communications (MTC) in a cell served by the eNB; transmit configuration information to a user equipment (UE), the configuration information indicating a size of a sub-band, of a system bandwidth for at least one component carrier (CC), for which the UE is to receive dynamic resource allocation (DRA) messages allocating resources to a primary partition and a secondary partition of the sub-band, the secondary partition including allocations for MTC, the primary partition including allocations for other than MTC, and portions of the system bandwidth outside the sub-band being allocated to the primary partition, the size being determined based on load conditions for MTC in the cell; transmit a control channel to the UE in at least the primary partition; and transmit data to MTC UEs in the secondary partition and to non-MTC UEs in the primary position.

In Example 20, the subject matter of Example 19 can optionally include wherein the configuration information further includes resource allocation information of the primary partition, the configuration information does not include resource allocation information of the secondary partition, and the hardware processing circuitry is further configured to transmit the control channel in the primary partition, wherein the control channel includes allocation information of the secondary partition.

In Example 21, the subject matter of any of Examples 19-20 can optionally include wherein the hardware processing circuitry is configured to detect a change in the load conditions for MTC; and to configure the transceiver circuitry to transmit configuration information revising the size of the sub-band responsive to detecting the change in load conditions.

In Example 22, the subject matter of any of Examples 19-21 can optionally include wherein the configuration information is transmitted in a system information block (SIB).

In Example 23, the subject matter of Example 22 can optionally include, wherein the hardware processing circuitry further configures the transceiver circuitry to: transmit updates of the DRA within a broadcast control channel (BCCH) modification period.

In Example 24, the subject matter of any of Examples 19-23 can optionally include wherein the configuration information is transmitted in UE-specific radio resource control (RRC) signaling.

In Example 25, the subject matter of any of Examples 19-24 can optionally include wherein the configuration information is transmitted in a master information block (MIB).

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

What is claimed is:

1. An apparatus for a user equipment (UE), the apparatus comprising transceiver circuitry and processing circuitry, the processing circuitry configured to cause the transceiver circuitry to:
receive configuration information from a base station, the configuration information directing the configuration of a plurality of frequency partitions of a system bandwidth;
monitor a physical downlink control channel (PDCCH) according to a PDCCH configuration, wherein the PDCCH configuration specifies a periodicity and offset in time for the PDCCH monitoring, wherein the periodicity and the time offset are jointly defined by an index which is configured by dedicated signaling to the UE; and
receive the physical downlink control channel (PDCCH) in a first of the frequency partitions, wherein the PDCCH is time and frequency division multiplexed with a physical downlink shared channel (PDSCH).

2. The apparatus of claim 1, wherein the frequency partitions include a primary partition and a secondary partition, wherein the primary partition is configured for a communication type other than machine type communication (MTC), wherein the secondary partition is configured for MTC.

3. The apparatus of claim 2, wherein the PDCCH is received from the primary partition, wherein the PDCCH includes resource allocation information for the secondary partition, wherein, if the UE is an MTC UE, the processing circuitry is configured to direct the transceiver circuitry to perform machine type communication in the secondary partition using the resource allocation information for the secondary partition, wherein the configuration information is devoid of resource allocation information.

4. The apparatus of claim 1, wherein the processing circuitry is configured to direct the transceiver circuitry to:
receive allocation information allocating at least a set of physical resource blocks (PRBs) within a secondary partition.

5. The apparatus of claim 1, wherein the PDCCH is received on a set of distributed physical resource blocks (PRBs) over consecutive orthogonal frequency-division multiplexing (OFDM) symbols.

6. The apparatus of claim 1, wherein processing circuitry is configured to direct the transceiver circuitry to:
receive the PDSCH, wherein the PDCCH includes at least an initial orthogonal frequency-division multiplexing (OFDM) symbol of a subframe.

7. The apparatus of claim 1, wherein the configuration information includes configuration information for frequency partitions of multiple component carriers (CCs).

8. A non-transitory memory medium storing program instructions for a user equipment (UE), wherein the program instructions, when executed by processing circuity, cause the UE to implement:
receiving configuration information from a base station, the configuration information directing the configuration of a plurality of frequency partitions of a system bandwidth;
monitoring a physical downlink control channel (PDCCH) according to a PDCCH configuration, wherein the PDCCH configuration specifies a periodicity and offset in time for the PDCCH monitoring, wherein the periodicity and the time offset are jointly defined by an index which is configured by dedicated signaling to the UE; and
receiving the physical downlink control channel (PDCCH) in a first of the frequency partitions, wherein the PDCCH is time and frequency division multiplexed with a physical downlink shared channel (PDSCH).

9. The non-transitory memory medium of claim 8, wherein the frequency partitions include a primary partition and a secondary partition, wherein the primary partition is configured for a communication type other than machine type communication (MTC), wherein the secondary partition is configured for MTC.

10. The non-transitory memory medium of claim 8, wherein the program instructions, when executed by processing circuity, further cause the UE to implement:
receiving allocation information allocating at least a set of physical resource blocks (PRBs) within a secondary partition.

11. The non-transitory memory medium of claim 8, wherein the PDCCH is received on a set of distributed physical resource blocks (PRBs) over consecutive orthogonal frequency-division multiplexing (OFDM) symbols.

12. The non-transitory memory medium of claim 8, wherein the program instructions, when executed by processing circuitry, further cause the UE to implement:
   receiving the PDSCH, wherein the PDCCH includes at least an initial orthogonal frequency- division multiplexing (OFDM) symbol of a subframe.

13. The non-transitory memory medium of claim 8, wherein the configuration information includes configuration information for frequency partitions of multiple component carriers (CCs).

14. A method for operating a user equipment (UE), the method comprising:
   receiving configuration information from a base station, the configuration information directing the configuration of a plurality of frequency partitions of a system bandwidth;
   monitoring a physical downlink control channel (PDCCH) according to a PDCCH configuration, wherein the PDCCH configuration specifies a periodicity and offset in time for the PDCCH monitoring, wherein the periodicity and the time offset are jointly defined by an index which is configured by dedicated signaling to the UE; and
   receiving the physical downlink control channel (PDCCH) in a first of the frequency partitions, wherein the PDCCH is time and frequency division multiplexed with a physical downlink shared channel (PDSCH).

15. The method of claim 14, wherein the frequency partitions include a primary partition and a secondary partition, wherein the primary partition is configured for a communication type other than machine type communication (MTC), wherein the secondary partition is configured for MTC.

16. The method of claim 15, wherein the PDCCH is received from the primary partition, wherein the PDCCH includes resource allocation information for the secondary partition, wherein, if the UE is an MTC UE, the method further comprises:
   directing the transceiver circuitry to perform machine type communication in the secondary partition using the resource allocation information for the secondary partition, wherein the configuration information is devoid of resource allocation information.

17. The method of claim 14, further comprising:
   receiving allocation information allocating at least a set of physical resource blocks (PRBs) within a secondary partition.

18. The method of claim 14, wherein the PDCCH is received on a set of distributed physical resource blocks (PRBs) over consecutive orthogonal frequency-division multiplexing (OFDM) symbols.

19. The method of claim 14, further comprising:
   receiving the PDSCH, wherein the PDCCH includes at least an initial orthogonal frequency- division multiplexing (OFDM) symbol of a subframe.

20. The method of claim 14, wherein the configuration information includes configuration information for frequency partitions of multiple component carriers (CCs).

* * * * *